US008490693B2

(12) United States Patent
Birchwood et al.

(10) Patent No.: US 8,490,693 B2
(45) Date of Patent: Jul. 23, 2013

(54) DETERMINING FRACTURE ORIENTATION USING WELLBORE ACOUSTIC RADIAL PROFILES

(75) Inventors: Richard A. Birchwood, Houston, TX (US); Tom R. Bratton, Littleton, CO (US)

(73) Assignee: Schlumberger Technology Corporation, Sugar Land, TX (US)

(*) Notice: Subject to any disclaimer, the term of this patent is extended or adjusted under 35 U.S.C. 154(b) by 488 days.

(21) Appl. No.: 12/706,855

(22) Filed: Feb. 17, 2010

(65) Prior Publication Data
US 2011/0042080 A1 Feb. 24, 2011

Related U.S. Application Data

(60) Provisional application No. 61/153,027, filed on Feb. 17, 2009.

(51) Int. Cl.
*E21B 47/026* (2006.01)
(52) U.S. Cl.
USPC .............. 166/250.1; 166/254.2; 702/11
(58) Field of Classification Search
USPC .... 166/249, 250.1, 254.2, 177.1, 177.2; 367/25, 367/86; 702/11, 13; 703/10
See application file for complete search history.

(56) References Cited

U.S. PATENT DOCUMENTS

| 2,951,535 | A | * | 9/1960 | Mihram et al. | 166/254.2 |
|---|---|---|---|---|---|
| 3,586,105 | A | * | 6/1971 | Johnson et al. | 166/250.1 |
| 4,432,078 | A | * | 2/1984 | Silverman | 367/37 |
| 4,587,641 | A | * | 5/1986 | DiFoggio | 367/30 |
| 4,669,546 | A | * | 6/1987 | Jennings et al. | 166/308.1 |
| 4,834,181 | A | * | 5/1989 | Uhri et al. | 166/281 |
| 4,885,723 | A | * | 12/1989 | Havira et al. | 367/35 |
| H1156 | H | * | 3/1993 | Siegfried, II | 367/31 |
| 5,377,104 | A | * | 12/1994 | Sorrells et al. | 702/11 |
| 5,402,392 | A | * | 3/1995 | Lu et al. | 367/75 |
| 5,517,854 | A | * | 5/1996 | Plumb et al. | 73/152.59 |
| 5,524,709 | A | * | 6/1996 | Withers | 166/250.1 |
| 5,574,218 | A | * | 11/1996 | Withers | 73/152.02 |
| 6,611,761 | B2 | | 8/2003 | Sinha et al. | |
| 6,614,716 | B2 | | 9/2003 | Plona et al. | |
| 6,715,551 | B2 | * | 4/2004 | Curtis et al. | 166/250.16 |
| 6,747,914 | B2 | * | 6/2004 | Aronstam | 367/31 |
| 6,798,208 | B2 | | 9/2004 | Omeragic | |
| H2116 | H | * | 4/2005 | Parra et al. | 367/56 |

(Continued)

OTHER PUBLICATIONS

Yamamoto et al., "Fracture Imaging from Sonic Reflections and Mode Conversion", 1999 SEG International Exposition and 69th Annual Meeting, Schlumberger, Houston, TX.

(Continued)

*Primary Examiner* — William P Neuder
*Assistant Examiner* — Robert E Fuller
(74) *Attorney, Agent, or Firm* — Colin Wier; Rodney Warfford

(57) ABSTRACT

A method for performing field operations is disclosed. The method includes obtaining a first set of acoustic radial profiles of a subterranean formation prior to induction of a fracture disposed about the wellbore, obtaining a second set of acoustic radial profiles of the subterranean formation subsequent to the induction of the fracture, comparing the first set of acoustic radial profiles and the second set of acoustic radial profiles based on a pre-determined criterion to generate a comparison result, determining, based on the comparison result, an orientation of one or more portions of the fracture, and adjusting the operations of the oilfield based on the orientation.

20 Claims, 8 Drawing Sheets

U.S. PATENT DOCUMENTS

| | | | |
|---|---|---|---|
| 6,924,646 B2 | 8/2005 | Omeragic | |
| 6,937,021 B2 | 8/2005 | Rosthal | |
| 7,042,802 B2 | 5/2006 | Sinha | |
| 7,187,620 B2 * | 3/2007 | Nutt et al. | 367/25 |
| 7,463,550 B2 | 12/2008 | Sinha et al. | |
| 7,516,793 B2 * | 4/2009 | Dykstra | 166/308.1 |
| 7,941,307 B2 * | 5/2011 | Symington et al. | 703/10 |
| 7,967,069 B2 * | 6/2011 | Beasley | 166/308.1 |
| 8,100,177 B2 * | 1/2012 | Smith et al. | 166/250.1 |
| 8,157,011 B2 * | 4/2012 | Taylor et al. | 166/308.1 |
| 2002/0122352 A1 * | 9/2002 | Khan | 367/57 |
| 2003/0004649 A1 * | 1/2003 | Khan | 702/16 |
| 2003/0125879 A1 * | 7/2003 | Khan et al. | 702/14 |
| 2003/0205375 A1 * | 11/2003 | Wright et al. | 166/250.1 |
| 2004/0176911 A1 * | 9/2004 | Bratton et al. | 702/6 |
| 2004/0206495 A1 * | 10/2004 | Lehman et al. | 166/250.1 |
| 2005/0256645 A1 * | 11/2005 | Rabinovich et al. | 702/7 |
| 2005/0270172 A1 * | 12/2005 | Bailey et al. | 340/854.3 |
| 2006/0100837 A1 * | 5/2006 | Symington et al. | 703/10 |
| 2006/0122777 A1 * | 6/2006 | Patzek et al. | 702/6 |
| 2006/0219402 A1 * | 10/2006 | Lecampion | 166/250.1 |
| 2006/0256656 A1 * | 11/2006 | Sinha et al. | 367/31 |
| 2006/0285437 A1 * | 12/2006 | Sinha et al. | 367/37 |
| 2007/0127313 A1 * | 6/2007 | Segall et al. | 367/38 |
| 2007/0150200 A1 * | 6/2007 | Charara et al. | 702/6 |
| 2007/0215345 A1 * | 9/2007 | Lafferty et al. | 166/250.1 |
| 2007/0256830 A1 * | 11/2007 | Entov et al. | 166/250.1 |
| 2007/0271039 A1 * | 11/2007 | Ella et al. | 702/12 |
| 2007/0272407 A1 * | 11/2007 | Lehman et al. | 166/250.1 |
| 2008/0164021 A1 * | 7/2008 | Dykstra | 166/250.1 |
| 2009/0003131 A1 * | 1/2009 | Meyer | 367/47 |
| 2009/0200019 A1 * | 8/2009 | DeLaCroix et al. | 166/249 |
| 2009/0288820 A1 * | 11/2009 | Barron et al. | 166/249 |
| 2011/0022319 A1 * | 1/2011 | Djikpesse et al. | 702/11 |
| 2011/0174490 A1 * | 7/2011 | Taylor et al. | 166/308.1 |

OTHER PUBLICATIONS

Yamamoto et al., "Borehole Acoustic Reflection Survey Experiments in Horizontal Wells for Accurate Well Positioning", CIM 65538, SPE/PS-CIM International Conference on Horizontal Well Technology, Calgary, Nov. 2000—Abstract.

* cited by examiner

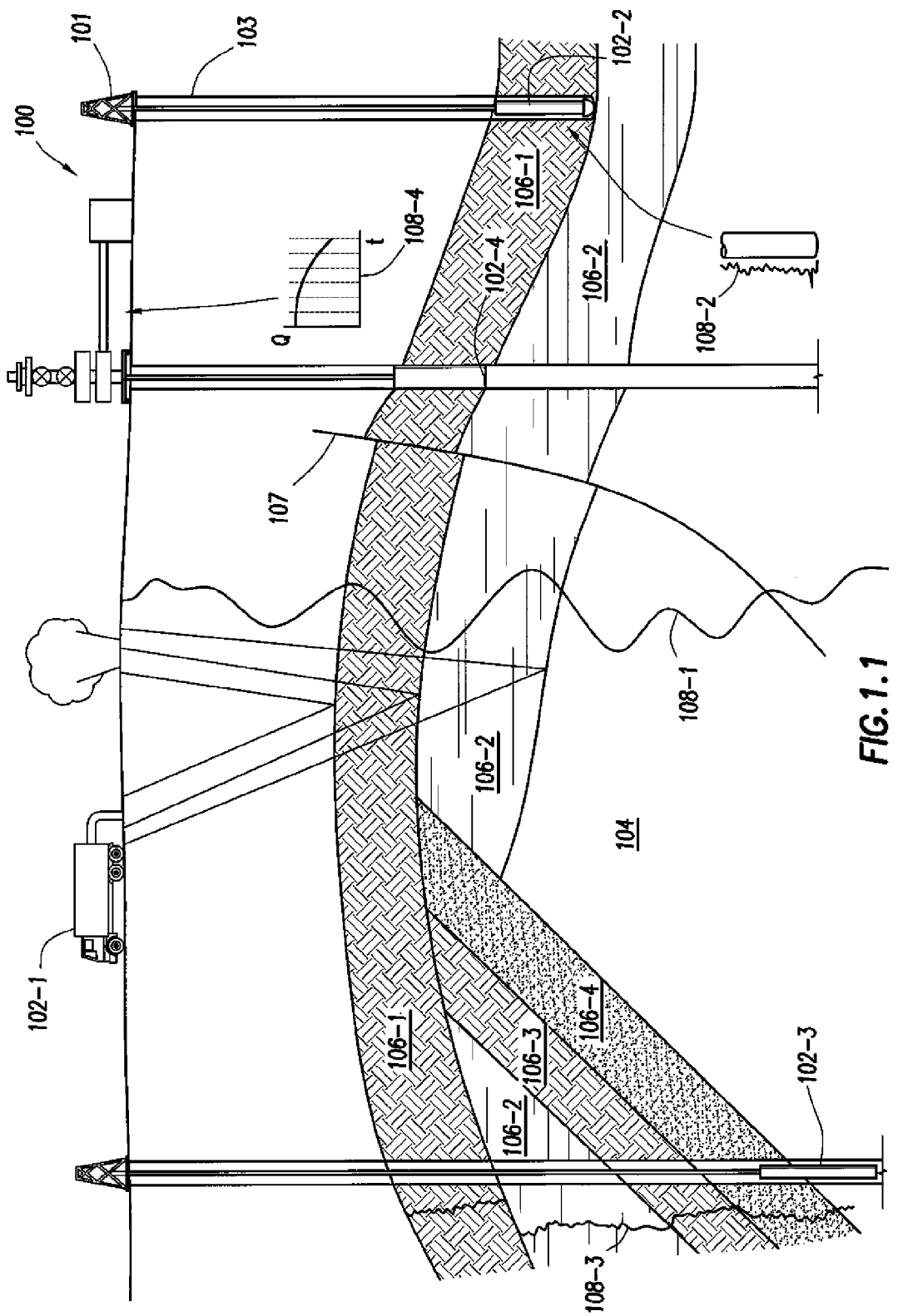
FIG.1.1

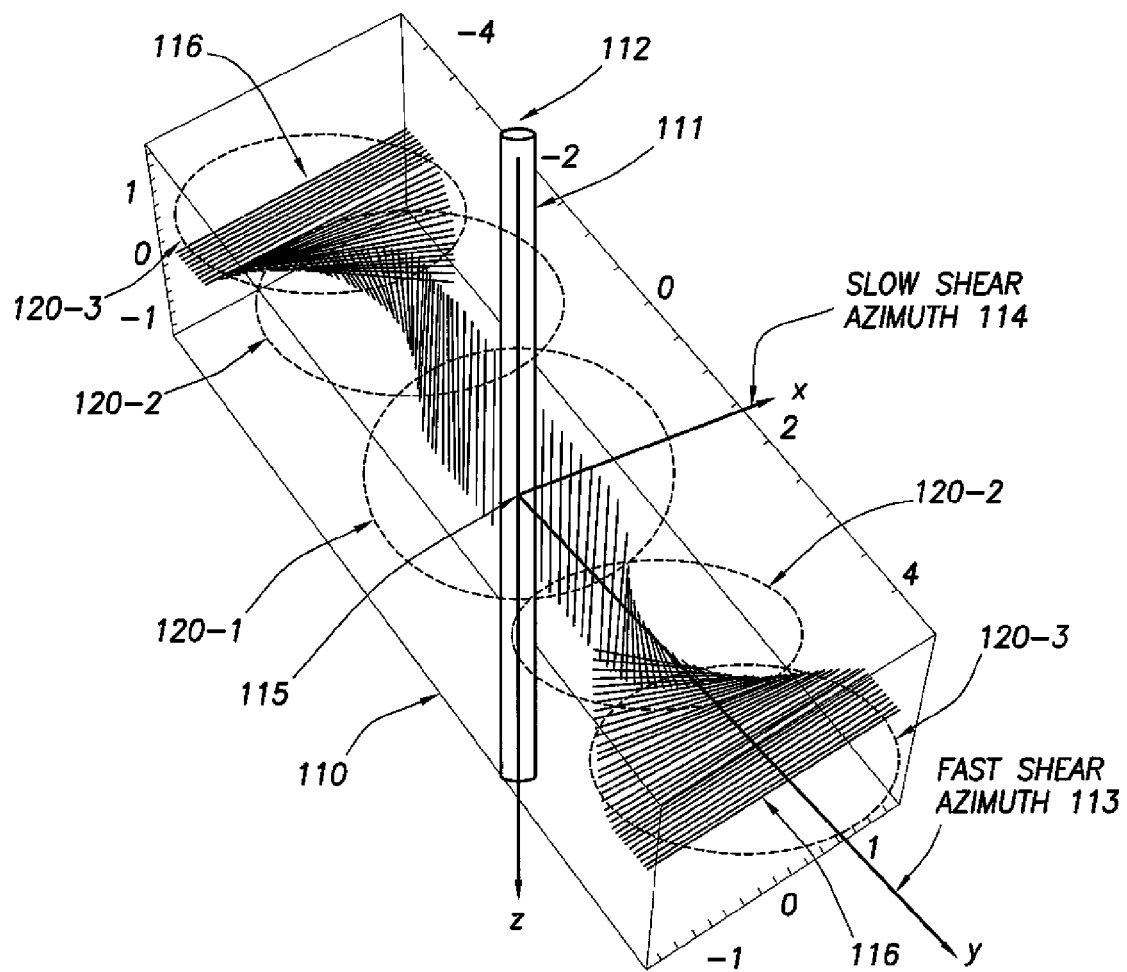
*FIG.1.2*

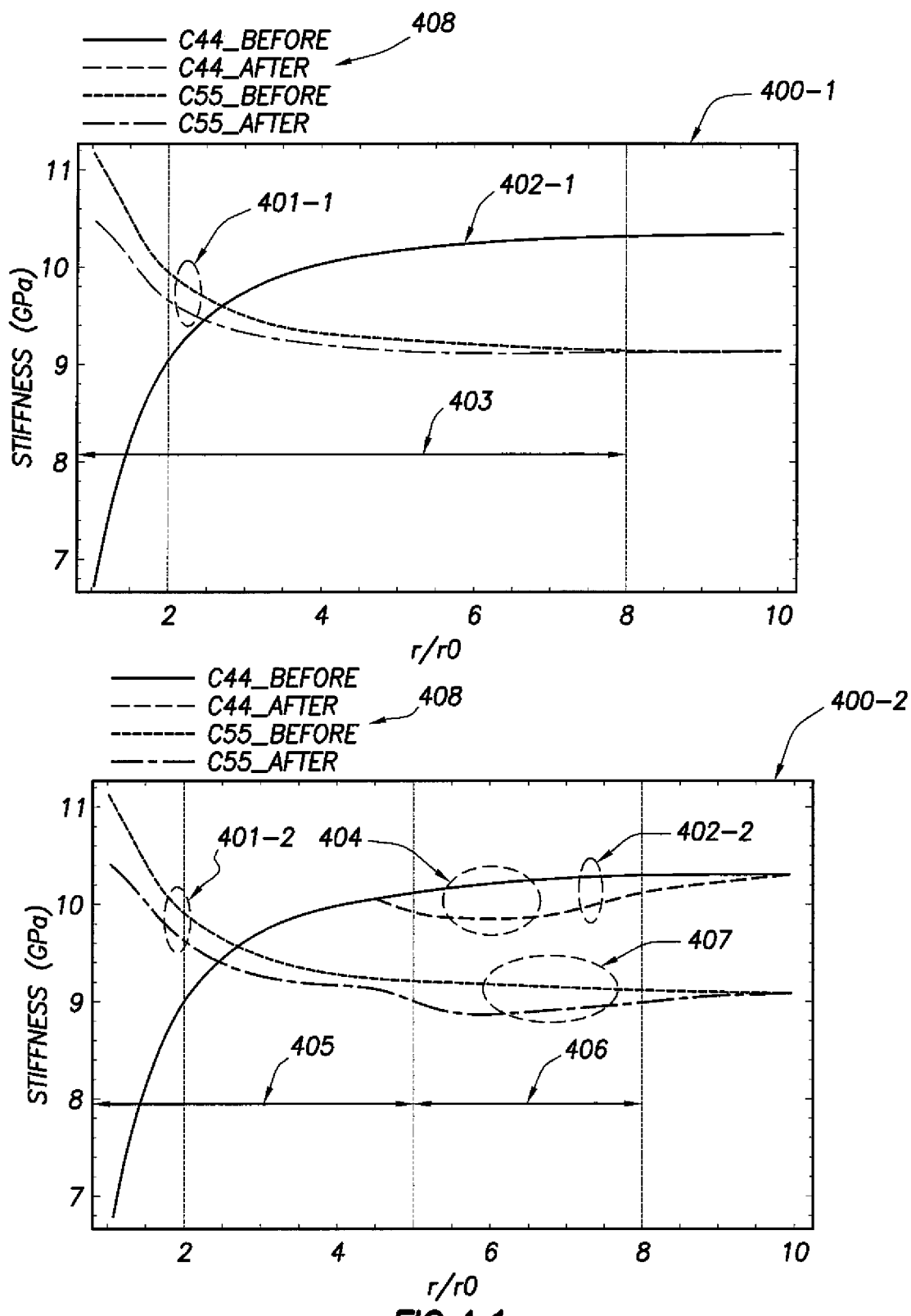
FIG.4.1

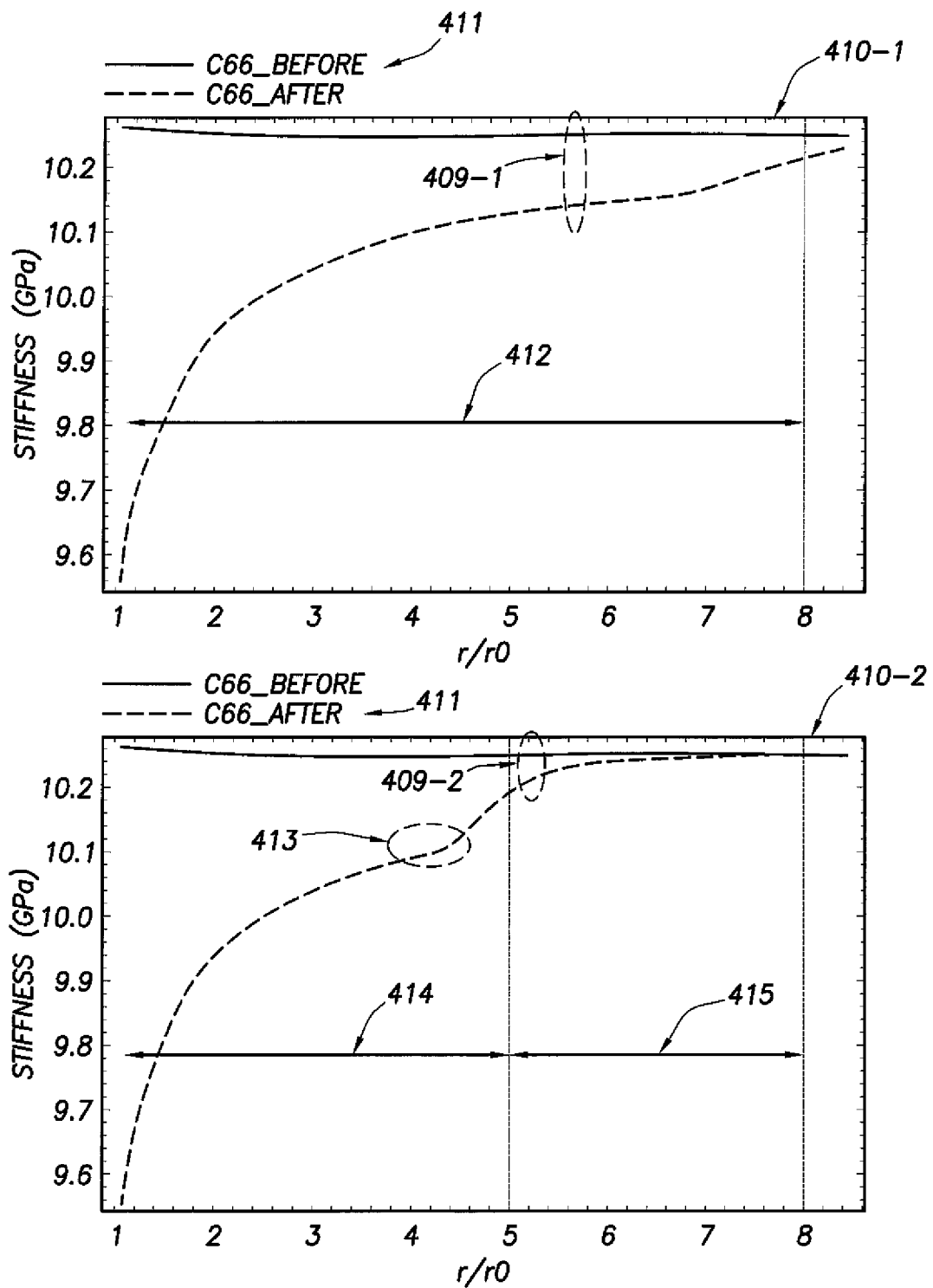
FIG.4.2

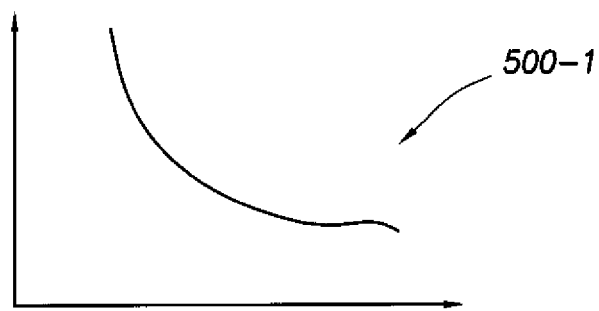
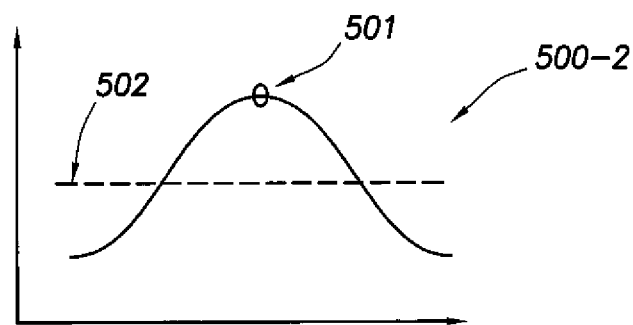
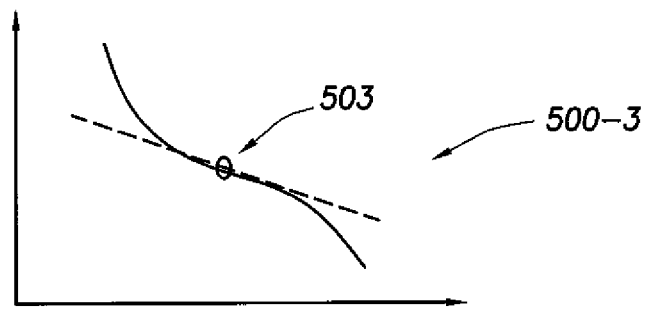
FIG.5

DETERMINING FRACTURE ORIENTATION USING WELLBORE ACOUSTIC RADIAL PROFILES

CROSS-REFERENCE TO RELATED APPLICATIONS

This application claims benefit of U.S. Provisional Patent Application No. 61/153,027, filed on Feb. 17, 2009, and entitled "DETERMINATION OF THE ORIENTATION OF FRACTURES IN ROCKS USING BOREHOLE ACOUSTIC RADIAL PROFILES," which is hereby incorporated by reference.

BACKGROUND

Operations, such as geophysical surveying, drilling, logging, well completing, and production, are typically performed to locate and gather valuable downhole fluids. Surveys are often performed using acquisition methodologies, such as seismic mapping to generate acoustic images of underground formations. These formations are often analyzed to determine the presence of subterranean assets, such as valuable fluids or minerals, or to determine if the formations have characteristics suitable for storing fluids. Although the subterranean assets are not limited to hydrocarbons such as oil, throughout this document, the terms "oilfield" and "oilfield operation" may be used interchangeably with the terms "field" and "field operation" to refer to a site where any types of valuable fluids or minerals can be found and the activities required to extract them. The terms may also refer to sites where substances are deposited or stored by injecting them into the surface using boreholes and the operations associated with this process.

During drilling and production operations, data is typically collected for analysis and/or monitoring of the operations. Such data may include, for instance, information regarding subterranean formations, equipment, and historical and/or other data.

Data concerning the subterranean formations is collected using a variety of sources. Such formation data may be static or dynamic. Static data relates to, for instance, formation structure and geological stratigraphy that define geological structures of the subterranean formation. Dynamic data relates to, for instance, fluids flowing through the geologic structures of the subterranean formation over time. Such static and/or dynamic data may be collected to learn more about the formations and the valuable assets contained therein.

Various equipment may be positioned about the field to monitor field parameters, to manipulate the operations and/or to separate and direct fluids from the wells. Surface equipment and completion equipment may also be used to inject fluids into reservoirs, either for storage or at strategic points to enhance production of the reservoir.

It is well known that mechanical disturbances can be used to establish acoustic waves in earth formations surrounding a wellbore, and the properties of these waves can be measured to obtain important information about the formations through which the waves have propagated. Properties of compressional, shear and Stoneley waves, such as their velocity (or its reciprocal, slowness) in the formation and in the wellbore, can provide useful information of formation characteristics that help in evaluation of the location and/or producibility of hydrocarbon resources.

Fractures in the earth play an essential role in influencing the movement of fluids in rocks. Fractures may be of natural origin or may be created artificially by operations associated with the exploitation of hydrocarbon or mineral reserves. For example, fractures may be deliberately induced in an oil or gas well by raising the wellbore fluid pressure until the surrounding rock fails in tension. Fractures produced in this manner are known as hydraulic fractures and they are frequently used in the petroleum industry to enhance production by providing high permeability conduits that promote the flow of hydrocarbons into the wellbore. The pressures measured in the wellbore during hydraulic fracturing may also be interpreted to obtain an estimate of the magnitude of stress in the earth.

In order to optimize production and correctly interpret stress in the earth, it is essential to understand the trajectories of fractures that intersect the wellbore. It is particularly important to determine whether such trajectories are planar or twisted. Twisted fractures tend to be less efficient producers than planar fractures as twisted fractures lead to tortuous flow paths and may contain choke points that impede the migration of hydrocarbons to the wellbore. Such fractures are sometimes produced during hydraulic fracturing operations in deviated (non-vertical) wells or more generally, in wells with trajectories that are not perpendicular to the smallest principal stress in the earth. For example, in locations where the vertical stress in the earth is the smallest principal stress, a hydraulic fracture in a vertical well may initiated as a vertical fracture and gradually twist to become horizontal as it propagates away from the wellbore.

SUMMARY

In general, in one aspect, determining fracture orientation using wellbore acoustic radial profiles involves a method for performing field operations having at least one wellsite, each wellsite having a wellbore penetrating a subterranean formation for accessing or storing substances therein. The method includes obtaining a first set of acoustic radial profiles of the subterranean formation based on a first sonic logging pass of the wellbore prior to induction of a fracture disposed about the wellbore, wherein the first set of acoustic radial profiles comprises a first set of elastic wave moduli as first functions of radial distance from the wellbore, obtaining a second set of acoustic radial profiles of the subterranean formation based on a second sonic logging pass of the wellbore subsequent to the induction of the fracture, wherein the second set of acoustic radial profiles comprises a second set of elastic wave moduli as second functions of the radial distance, comparing, using a central processing unit (CPU) of a computer system, the first set of acoustic radial profiles and the second set of acoustic radial profiles based on a pre-determined criterion to generate a comparison result, determining, using the CPU and based on the comparison result, an orientation of one or more portions of the fracture, and adjusting the operations of the oilfield based on the orientation.

Other aspects of determining fracture orientation using wellbore acoustic radial profiles will be apparent from the following description and the appended claims.

BRIEF DESCRIPTION OF DRAWINGS

The appended drawings illustrate several embodiments of determining fracture orientation using wellbore acoustic radial profiles and are not to be considered limiting of its scope, for determining fracture orientation using wellbore acoustic radial profiles may admit to other equally effective embodiments.

FIG. 1.1 depicts a schematic view, partially in cross-section, of a field having a plurality of data acquisition tools positioned at various locations within the field for collecting data from the subterranean formation, in which embodiments of determining fracture orientation using wellbore acoustic radial profiles may be implemented.

FIG. 1.2 depicts an earth formation penetrated by a wellbore and having an example fracture for which embodiments of determining fracture orientation using wellbore acoustic radial profiles may be implemented.

FIGS. 4.1 and 4.2 depict example radial profiles for determining fracture orientation using wellbore acoustic radial profiles in accordance with one or more embodiments.

FIG. 5 depicts an example of comparing radial profiles to determine fracture orientation using wellbore acoustic radial profiles in accordance with one or more embodiments.

DETAILED DESCRIPTION

Figure 2:
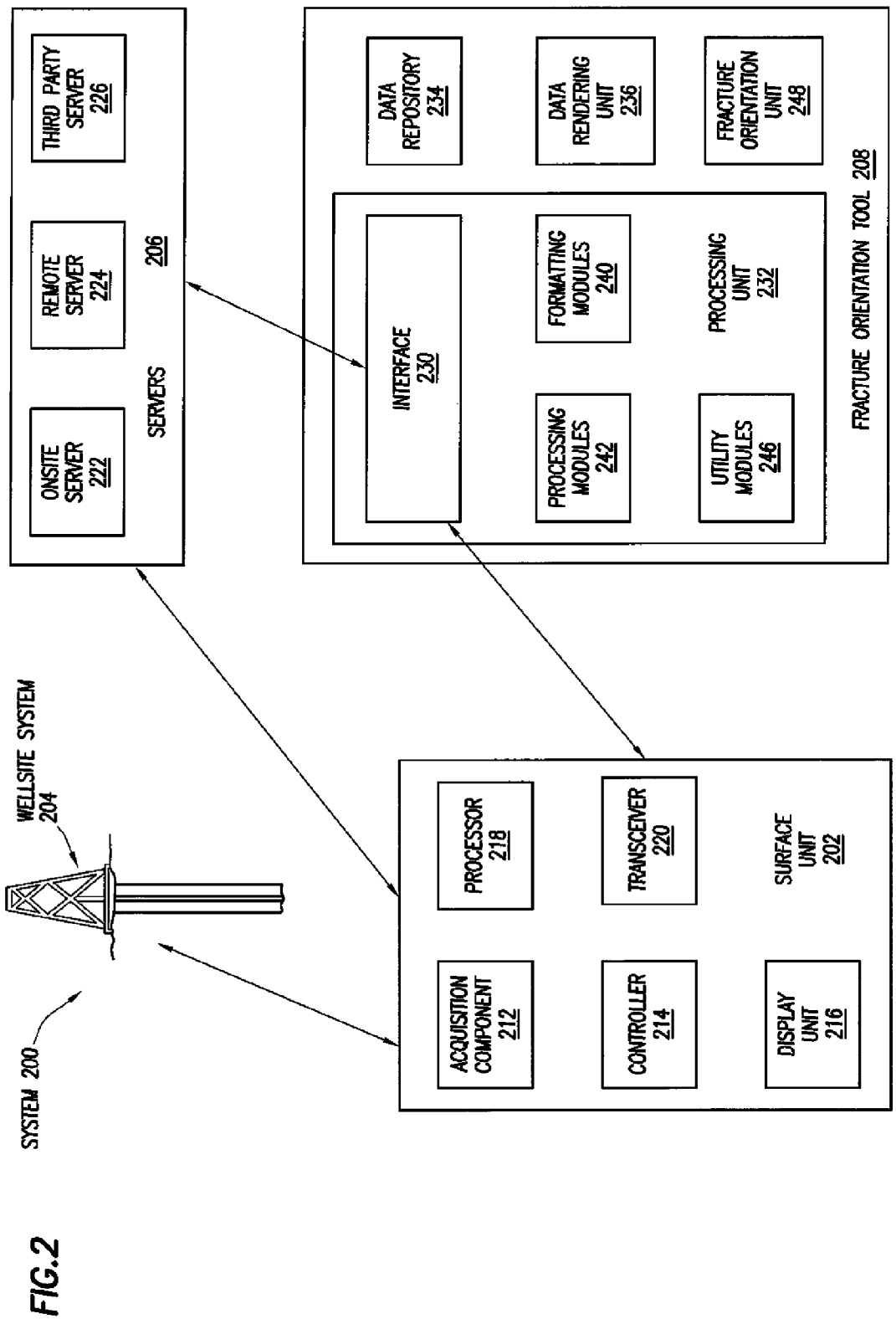
FIG. 2 depicts a system in which one or more embodiments of determining fracture orientation using wellbore acoustic radial profiles may be implemented.

Embodiments are shown in the above-identified drawings and described below. In describing the embodiments, like or identical reference numerals are used to identify common or similar elements. The drawings are not necessarily to scale and certain features may be shown exaggerated in scale or in schematic in the interest of clarity and conciseness.

The embodiments described herein involve a method and a system for determining variations in the orientation of a fracture with respect to radial distance from a wellbore (i.e., distance in the radial direction measured from the center of the wellbore). In particular, fracture orientation is inferred on the basis of acoustic data acquired using wellbore logging tools. In one or more embodiments of determining fracture orientation using wellbore acoustic radial profiles, the determination of fracture orientation is performed using acoustic radial profiles, which are measurements of acoustic velocity or elastic wave moduli derived therefrom as functions of radial distance from the wellbore. Example techniques for determining wellbore acoustic radial profiles are described in U.S. Pat. No. 6,611,761 entitled "Sonic Well Logging for Radial Profiling" and U.S. Pat. No. 7,042,802 entitled "Determination of Stress Characteristics of Earth Formations", both of which are incorporated herein by reference.

Throughout this document depending on the context, the term "radial distance" may refer to a variable (e.g., a variable of a mathematical function) or a value of such variable. Having the benefits of this disclosure, those of ordinary skill in the art will appreciate that other variants of this technique, such as the use of sonic dispersion curves or acoustic wave polarization, may also be used in lieu of acoustic radial profiles.

FIG. 1.1 depicts a schematic view, partially in cross section of a field (100) having data acquisition tools (102-1), (102-2), (102-3), and (102-4) positioned at various locations in the field for gathering data related to a subterranean formation (104). As shown, the data collected from the tools (102-1 through 102-4) can be used to generate data plots (108-1 through 108-4), respectively.

As shown in FIG. 1.1, the subterranean formation (104) includes several geological structures (106-1 through 106-4). As shown, the formation has a sandstone layer (106-1), a limestone layer (106-2), a shale layer (106-3), and a sand layer (106-4). A fault line (107) extends through the formation. In one or more embodiments, the data acquisition tools are adapted to measure the formation and detect the characteristics of the geological structures of the formation.

As shown in FIG. 1.1, a drilling operation is depicted as being performed by drilling tools (102-2) suspended by a rig (101) and advanced into the subterranean formations (104) to form a wellbore (103). The drilling tools (106-2 may be adapted for measuring downhole properties using logging-while-drilling ("LWD") tools.

A surface unit (not shown) is used to communicate with the drilling tools (102-2) and/or offsite operations. The surface unit is capable of communicating with the drilling tools (102-2) to send commands to the drilling tools (102-2), and to receive data therefrom. The surface unit may be provided with computer facilities for receiving, storing, processing, and/or analyzing data from the oilfield. The surface unit collects data generated during the drilling operation and produces data output which may be stored or transmitted. Computer facilities, such as those of the surface unit, may be positioned at various locations about the oilfield and/or at remote locations.

Sensors, such as gauges, may be positioned about the oilfield to collect data relating to various oilfield operations as described previously. For example, the sensor may be positioned in one or more locations in the drilling tools (102-2) and/or at the rig (101) to measure drilling parameters, such as weight on bit, torque on bit, pressures, temperatures, flow rates, compositions, rotary speed and/or other parameters of the oilfield operation.

The data gathered by the sensors may be collected by the surface unit and/or other data collection sources for analysis or other processing. The data collected by the sensors may be used alone or in combination with other data. The data may be collected in one or more databases and/or transmitted on or offsite. All or select portions of the data may be selectively used for analyzing and/or predicting oilfield operations of the current and/or other wellbores. The data may be may be historical data, real time data or combinations thereof. The real time data may be used in real time, or stored for later use. The data may also be combined with historical data or other inputs for further analysis. The data may be stored in separate databases, or combined into a single database.

The collected data may be used to perform activities, such as wellbore steering. In another example, the seismic data output may be used to perform geological, geophysical, and/or reservoir engineering. In this example, the reservoir, wellbore, surface and/or process data may be used to perform reservoir, wellbore, geological, geophysical, or other simulations. The data outputs from the oilfield operation may be generated directly from the sensors, or after some preprocessing or modeling. These data outputs may act as inputs for further analysis.

As shown in FIG. 1.1, data plots (108-1 through 108-4) are examples of plots of static and/or dynamic properties that may be generated by the data acquisition tools (102-1 through 102-4), respectively. For example, data plot (108-1) is an amplitude of a seismic wave. In another example, data plot (108-2) is core sample data measured from a core sample of the formation (104). In another example, data plot (108-3) is a logging trace. In another example, data plot (108-4) is a plot of a dynamic property, the fluid flow rate over time. Those skilled in the art will appreciate that other data may also be collected, such as, but not limited to, historical data, user inputs, economic information, other measurement data, and other parameters of interest.

While a specific subterranean formation (104) with specific geological structures is depicted, it will be appreciated that the formation may contain a variety of geological structures. Fluid, rock, water, oil, gas, and other geomaterials may also be present in various portions of the formation. Each of the measurement devices may be used to measure properties of the formation and/or its underlying structures. While each acquisition tool is shown as being in specific locations along the formation, it will be appreciated that one or more types of measurement may be taken at one or more locations across one or more fields or other locations for comparison and/or analysis using one or more acquisition tools. The terms measurement device, measurement tool, acquisition tool, and/or field tools are used interchangeably in this documents based on the context.

The data collected from various sources, such as the data acquisition tools of FIG. 1.1, may then be evaluated. Typically, seismic data displayed in the data plot (108-1) from the data acquisition tool (102-1) is used by a geophysicist to determine characteristics of the subterranean formation (104). Core data shown in plot (108-2) and/or log data from the well log (108-3) is typically used by a geologist to determine various characteristics of the geological structures of the subterranean formation (104). Production data from the production graph (108-4) is typically used by the reservoir engineer to determine fluid flow reservoir characteristics.

FIG. 1.2 depicts an earth formation (110) penetrated by a wellbore section (111) and having an example fracture (120-1 to 120-3) for which embodiments of determining fracture orientation using wellbore acoustic radial profiles may be implemented. For example, the earth formation (110) may be essentially the same as the formation (104) depicted in FIG. 1.1 above while the wellbore section (111) may be a portion of the wellbore (103) as depicted in FIG. 1.1 above.

As shown in FIG. 1.2, an axis (112) of the wellbore section (111) lies in a vertical direction represented by Z axis of a three dimensional space overlaying the formation (110). The wellbore section (111) may be a portion of a vertical wellbore (e.g., wellbore (103)) or a portion of a wellbore (not shown) with varying orientations having one or more vertical sections. The three dimensional space overlaying the formation (110) has orthogonal axes X, Y, and Z along a fast shear azimuth (113), a slow shear azimuth (114), and the wellbore axis (112), respectively. In addition, the three dimensional space overlaying the formation (110) has an origin (115).

In geophysics, the fast shear azimuth (113) is the direction of the radial vector that coincides most closely with the direction of particle motion (polarization) induced by a fast shear wave (not shown) propagating parallel to the wellbore axis (112) in the undisturbed rock (i.e., the far-field) far away from the wellbore (111). Similarly, the slow shear azimuth (114) is the direction of the radial vector that coincides most closely with the direction of particle motion (polarization) induced by a slow shear wave (not shown) propagating parallel to the wellbore axis (112) in the far-field. Frequently, for a vertical well, the fast shear azimuth (113) is in the direction of maximum horizontal stress while the slow shear azimuth (114) is in the direction of the minimum horizontal stress in the formation (110). The far-field may be considered as the portion of the formation that is sufficiently far from the wellbore that the formation's stress state is uninfluenced by the stress concentration that develops around the wellbore. Typically, the stress concentration at the wellbore becomes negligible at distances of approximately 10 wellbore radii from the wellbore (111) (the wellbore radius is denoted as r0 throughout this document). For example, when the diameter of the wellbore (111) is 8" (i.e., r0=4"), rocks located at least 40" away from the wellbore axis (112) may be considered to be located in the far-field.

Further as shown in FIG. 1.2, the fracture (120-1 to 120-3) may be induced in a hydraulic fracturing operation performed by applying pressure (i.e., hydraulic pressure) to a section of the wellbore wall (111) in the vicinity of the origin (115). Here, the fracture plane (120-1 to 120-3) is depicted using line segments and is divided into three portions: a vertical portion (120-1) nearest to the well, a rotating portion (102-2) further from the well, and a horizontal portion (120-3) furthest from the well. The fracture plane represents a region where the rock is damaged by excessive shear or tension produced by the pressurized fracturing fluid. The fracturing fluid causes the fracture fronts (116) to propagate parallel to the maximum horizontal stress direction (i.e., fast shear azimuth (113)) away from the wellbore section (111). Although three specific portions of the fracture (120-1, 120-2, 120-3) are shown in FIG. 1.2, other geometrical configurations are possible depending on the stresses in the formation, the properties of the rock, the presence of mechanical defects in the wellbore wall, and the design of the hydraulic fracturing operation.

Materials that quickly regain their original shape after being deformed by a force are referred to as being elastic. For example, elastic properties of a material may be represented by a linear stress-strain relationship known as Hooke's law. An elastic modulus, known as Young's modulus of elasticity, is used to quantify the tendency of a material to deform elastically (i.e., non-permanently) when a force is applied. Young's modulus is defined as the slope of the stress-strain curve in the elastic (linear) deformation region. Likewise an elastic modulus known as a shear modulus quantifies the tendency of a material to deform when sheared within a given plane. In material science nomenclature, $C_{44}$, $C_{55}$, and $C_{66}$, are the shear moduli of three mutually perpendicular planes aligned parallel or perpendicular to the fast shear azimuth (113) or slow shear azimuth (114). For example, $C_{44}$ characterizes a plane containing the wellbore axis (112) and a radial vector directed along the fast shear azimuth (113), $C_{55}$ characterizes a plane containing the wellbore axis (112) and a radial vector directed along the slow shear azimuth (114), and $C_{66}$ characterizes a plane perpendicular to the wellbore axis (112). The response of these shear moduli $C_{44}$, $C_{55}$, and $C_{66}$ to the presence of the fracture (120-1 to 120-3) depends on the orientation of the fracture (120-1 to 120-3) with respect to the planes characterized by $C_{44}$, $C_{55}$, and $C_{66}$. For example, the last fracture portion (120-3) aligned perpendicular to the wellbore axis (112) tends to have a much larger effect on $C_{44}$ and $C_{55}$ than on $C_{66}$. On the other hand, the initial fracture portion (120-1) located in the plane associated with $C_{44}$ tends to have little effect on $C_{44}$, but a significant effect on $C_{55}$ and $C_{66}$.

Wellbore acoustic radial profiles are measurements of acoustic velocities or elastic wave moduli as functions of radial distance from the wellbore (e.g., wellbore section (111)). For example with wellbore sonic logging technology, it is possible to extract acoustic radial profiles of the shear moduli $C_{44}$, $C_{55}$, $C_{66}$, and velocity $V_p$ of a compressional wave traveling along the wellbore axis (e.g., wellbore axis (112)). The measurements in the acoustic radial profiles are generally azimuth dependent. In other words, in reference to FIG. 1.2, the measurements at the same radial distance from the wellbore section (111) may be different at different polar angles in the X-Y plane.

Although the example fracture (120-1 to 120-3) described above includes a transitional orientation (i.e., within the intermediate fracture portion (120-2)) and separate fracture portions (120-1, 120-2, 120-3) with different fracture orientations, other fractures may be found in the field (100) that do not include any transitional orientation or do not include more than one fracture orientation. In particular, the transitional orientation may also be referred to as rotational orientation or non-planar orientation while the vertical and horizontal orientations may be referred to as planar orientation. Further, in one example, the transitional orientation within the intermediate fracture portion (120-2) may be located within a short range of the wellbore section (111) and may significantly affect various oilfield operations while in other examples, the transitional orientation within the intermediate fracture portion (120-2) may be located further away from the wellbore section (111) and may have a minimal impact on oilfield operations. Furthermore, horizontal wells, deviated wells, non-perpendicular orientations between wellbore axis and maximum/minimum horizontal stress directions may also be considered in embodiments of determining fracture orientation and fracture transitional orientation using acoustic radial profiles, which are described in more detail with respect to FIGS. 2-5 below.

FIG. 2 depicts a system (200) incorporated with a portion of a field, as shown and described above with respect to FIG. 1.1. As shown, the system (200) includes a surface unit (202) operatively connected to a wellsite system (204), servers (206), and a fracture orientation tool (208) via an interface (230) on the fracture orientation tool (208). The fracture orientation tool (208) is also operatively linked, via the interface (230), to the servers (206). The surface unit (202) and wellsite system (204) may include various field tools and wellsite facilities. As shown, communication links are provided between the surface unit (202) and the wellsite system (204), servers (206), and fracture orientation tool (208). A communication link is also provided between the fracture orientation tool (208) and the servers (206). A variety of links may be provided to facilitate the flow of data through the system (200). For example, the communication links may provide for continuous, intermittent, one-way, two-way and/or selective communication throughout the system (200). The communication links may be of any type, including but not limited to wired and wireless.

In one or more embodiments, the wellsite system (204) may be associated with a rig (e.g., rig (101) of FIG. 1.1), a wellbore (e.g., wellbore section (111) of FIG. 1.1), and other wellsite equipment and is configured to perform oilfield operations as described above with respect to FIG. 1.1. Specifically, the wellsite system (204) may be configured to perform operations (e.g., drilling, fracturing, production, or other oilfield operations) as directed by a surface unit (202). In one or more embodiments, the surface unit (202) is provided with an acquisition component (212), a controller (214), a display unit (216), a processor (218), and a transceiver (220). The acquisition component (212) collects and/or stores data of the field. This data may be measured by sensors at the wellsite. This data may also be received from other sources, such as those described with respect to FIG. 1.1 above.

The controller (214) may be enabled to enact commands at the field. The controller (214) may be provided with actuation means that can perform drilling operations, such as steering, advancing, etc., or otherwise taking action for other operations, such as fracturing, production, etc. at the welisite. Commands may be generated based on logic of the processor (218), or by commands received from other sources. In one or more embodiments, the processor (218) is provided with functionality for manipulating and analyzing the data. The processor (218) may be provided with additional functionality to perform field operations.

In one or more embodiments, a display unit (216) may be provided at the welisite and/or remote locations for viewing field data (not shown). The field data represented by the display unit (216) may be raw data, processed data and/or data outputs generated from various data. In one or more embodiments, the display unit (216) is adapted to provide flexible views of the data, so that the screens depicted may be customized as desired. A user may plan, adjust, and/or otherwise perform field operations (e.g., determine the desired course of action during field operations) based on reviewing the displayed field data. The field operations may be selectively adjusted in response to viewing the data on the display unit (216). The display unit (216) may include a two-dimensional (2D) display or a three-dimensional (2D) display for viewing field data or various aspects of the field operations.

In one or more embodiments, the transceiver (220) provides a means for providing data access to and/or from other sources. The transceiver (220) may also provide a means for communicating with other components, such as the servers (206), the wellsite system (204), the surface unit (202), and/or the fracture orientation tool (208).

The servers (206) may be configured to transfer data from a surface unit (202) at one or more wellsites to the fracture orientation tool (208). As shown, the servers (206) include an onsite server (222), a remote server (224), and a third party server (226). The onsite server (222) may be positioned at the wellsite and/or other locations for distributing data from the surface unit (202). As shown, the remote server (224) is positioned at a location away from the field and provides data from remote sources. The third party server (226) may be onsite or remote, but is often operated by a third party, such as a client.

In one or more embodiments, the servers (206) are capable of transferring data, such as logs, drilling events, trajectory, seismic data, historical data, economics data, other field data, and/or other data that may be of use during analysis. The type of server is not intended to limit determining fracture orientation using wellbore acoustic radial profiles. In one or more embodiments, the system is adapted to function with any type of server that may be employed.

In one or more embodiments, the servers (206) communicate with the fracture orientation tool (208) through the communication links. As indicated by the multiple arrows, the servers (206) may have separate communication links with the fracture orientation tool (208) and the surface unit (202). One or more of the servers (206) may be combined or linked to provide a combined communication link.

In one or more embodiments, the servers (206) collect a wide variety of data. The data may be collected from a variety of channels that provide a certain type of data, such as well logs and other acoustic measurement profiles. The data from the servers is passed to the fracture orientation tool (208) for processing. The servers (206) may also be configured to store and/or transfer data. For example, the data may be collected at the wellsite system (204) using measurements-while-drilling (MWD) tools, logging-while-drilling (LWD) tools, wireline logging tools, any other similar types of logging measurement tools, or any combination thereof. More specifically, the MWD tools, LWD tools, and/or wireline logging tools may be configured to obtain information related to wellbore azimuth, azimuth of minimum/maximum horizontal stress, and/or elastic properties of the formation during a drilling, fracturing, or logging operation of the wellbore at the wellsite system (204).

For example, a wireline log is a measurement of a formation property as a function of depth with an electrically powered instrument to infer properties and make decisions about drilling and production operations. The record of the measurements, typically on a long strip of paper, may also be referred to a log. Measurements obtained by a wireline log may include directional sonic measurements obtained by a dipole sonic tool such as the acoustic radial profiles. The measurements of such a tool (from which the $C_{44}$ and $C_{55}$ information may be extracted in a vertical well) have been shown to be dependent on azimuth. In one or more embodiments, the dipole sonic tool used for the wireline logging has eight azimuthal receivers and is configured to quantify the azimuthal dependence of $C_{44}$ and $C_{55}$. The recordings made by two opposite receivers are subtracted to obtain four dipole signals (e.g., N/S, NE/SW, E/W and SE/NW). Accordingly, a sine wave model may be fit to the dipole measurements to estimate the signal at any azimuth. In one or more embodiments, the sonic tool used for wireline logging may also use a monopole source for measuring a Stoneley radial profile where the measurement results of the eight azimuthal receivers are averaged.

In another example, a directional surveying tools may be configured to evaluate physical properties during the drilling/fracturing of a wellbore, for example by obtaining magnetometer data and/or accelerometer data for determining the wellbore direction. Further, logging tools that measure formation parameters (resistivity, porosity, sonic velocity, gamma ray) may be configured to obtain electrical images of the wellbore for identifying drilling and/or hydraulically induced fractures. Drilling and/or hydraulically induced fractures have been shown to be directly related to the orientation of formation stresses.

In one or more embodiments, the fracture orientation tool (208) is operatively linked to the surface unit (202) for receiving data therefrom. In some cases, the fracture orientation tool (208) and/or server(s) (206) may be positioned at the wellsite. The fracture orientation tool (208) and/or server(s) (206) may also be positioned at various locations. The fracture orientation tool (208) may be operatively linked to the surface unit (202) via the server(s) (206). The fracture orientation tool (208) may also be included in or located near the surface unit (202).

In one or more embodiments, the fracture orientation tool (208) includes an interface (230), a processing unit (232), a data repository (234), and a data rendering unit (236). In one or more embodiments, the fracture orientation unit (248) of the fracture orientation tool (208) is configured to monitor downhole properties for determining an orientation of a fracture (e.g., acoustic velocity measurements as a function of radial distance). More specifically, the fracture orientation unit (248) may be configured to use downhole properties obtained by MWD tools, LWD tools, and/or wireline tools at the wellsite system (204) to identify a transitional orientation of the fracture, where the transitional orientation is used to determine whether the fracture is a planar fracture or a twisted fracture. In this case, the downhole properties may be obtained from the servers (206), where the wellsite system (204) and surface unit (202) are configured to store the downhole properties in the servers (206) in real time.

Generally speaking, fractures tend to alter the bulk elastic properties of rocks because the fractures are generally either stiffer or more compliant (softer) than the host rock (i.e., rocks that host the fractures). Wellbore acoustic measurements are sensitive to the elastic properties of rocks and may detect the presence and attributes of fractures if elastic properties of the fractures are sufficiently distinct from those of the host rock. The effect of a fracture on the elastic properties of a rock depends not only on the elastic properties of the fracture but also on the fracture's orientation. If the compliance of a fracture is different from the compliance of the host rock, elastic properties measured within planes parallel to the fracture will be different from the elastic properties measured within planes that intersect the fracture.

As described above with respect to FIG. 1.2, values of acoustic velocities (e.g., $V_p$) or elastic wave moduli (e.g., $C_{44}$, $C_{55}$, $C_{66}$) may be extracted from sonic tool measurements. In one or more embodiments, the fracture orientation unit (248) is configured to compare the acoustic measurements obtained before and after the creation of the fracture (e.g., induced by hydraulic fracturing operation) to determine an orientation of a portion of the fracture and/or identify a transitional orientation at a particular radial distance from the wellbore. As noted above, acoustic radial profiles are generally azimuth dependent. In this case, the shear moduli $C_{44}$, $C_{55}$, $C_{66}$, and velocity $V_p$ used by the fracture orientation unit (248) may be obtained using MWD tools, LWD tools, and/or wireline tools at the wellsite system (204). As noted above, the wellbore azimuth, the fast shear azimuth, and the intersecting angle therebetween may be determined using MWD tools, LWD tools, and/or wireline tools. More details of the shear moduli $C_{44}$, $C_{55}$, and $C_{66}$ and the procedures used to compare them and determine the orientation or transitional orientation of the fracture are described with respect to FIGS. 3-5 below.

Optionally, the fracture orientation unit (248) may be configured to adjust (e.g., modify or continually update) an earth model (e.g., a deterministic or statistical model of formation properties or stresses) based on the inferred fracture orientation and/or transitional orientation. For example, the earth model may initially be generated based on subsurface measurements as described above with respect to FIG. 1.1 and the updated earth model may be used to optimize oilfield operations such as those described above with respect to FIG. 1.1.

In one or more embodiments, the interface (230) of the fracture orientation tool (208) is configured to communicate with the servers (206) and the surface unit (202). The interface (230) may also be configured to communicate with other oilfield or non-oilfield sources. The interface (230) may be configured to receive the data and map the data for processing. In one or more embodiments, data from the servers (206) is sent along predefined channels, which may be selected by the interface (230).

As depicted in FIG. 2, the interface (230) selects the data channel of the server(s) (206) and receives the data. In one or more embodiments, the interface (230) also maps the data channels to data from the wellsite. The data may then be passed from the interface (230) to the processing modules (242) of the processing unit (232). In one or more embodiments, the data is immediately incorporated into the fracture orientation tool (208) for real time sessions and/or modeling. The interface (230) may create data requests (e.g., profiles, surveys, logs, MWD/LWD data, etc.), display the user interface, and monitor connection state events. In one or more embodiments, the interface (230) also instantiates the data into a data object for processing.

In one or more embodiments, the processing unit (232) includes formatting modules (240), processing modules (242), and utility modules (246). These modules are configured to manipulate the field data for analysis, potentially in real time.

In one or more embodiments, the formatting modules (240) transform the data to a desired format for processing. Incoming data may be formatted, translated, converted, or otherwise manipulated for use. In one or more embodiments, the formatting modules (240) are configured to enable the data from a variety of sources to be formatted and used so that the data processes and displays in real time.

In one or more embodiments, the utility modules (246) provide support functions to the fracture orientation tool (208). In one or more embodiments, the utility modules (246) include a logging component (not shown) and a user interface (UI) manager component (not shown). The logging component provides a common call for the logging data, which allows the logging destination to be set by the application using the utility modules (246). The logging component may also be provided with other features, such as a debugger, a messenger, and a warning system, among others. The debugger sends a debug message to users of the system. The messenger sends information to subsystems, users, and others. The information sent by the messenger may or may not interrupt the operation and may be distributed to various locations and/or users throughout the system. The warning system may be configured to send error messages and warnings to various locations and/or users throughout the system. In some cases, the warning messages may interrupt the process and display alerts.

In one or more embodiments, the user interface (UI) manager component (not shown) creates user interface elements for displays. The UI manager component defines user input screens, such as menu items, context menus, toolbars, and settings windows. The UT manager may also be configured to direct events relating to these user input screens.

In one or more embodiments, the processing modules (242) are configured to analyze the data and generate outputs. As described above, the data analyzed by the processing modules (242) may include static data, dynamic data, historic data, real time data, or other types of data. Further, the data analyzed by the processing modules (242) may relate to various aspects of the field operations, such as formation structure, geological stratigraphy, core sampling, well logging, density, resistivity, fluid composition, flow rate, downhole condition, surface condition, equipment condition, or other aspects of the field operations. In one or more embodiments, the data is processed by the processing module (242) into multiple volume data sets for storage and retrieval.

In one or more embodiments, the data repository (234) stores the data for the fracture orientation tool (208). The data stored in the data repository (234) may be in a format available for use in real time (e.g., information is updated at approximately the same rate that the information is received). In one or more embodiments, the data is passed to the data repository (234) from the processing modules (242). The data can be persisted in the file system (e.g., as an extensible markup language (XML) file) or in a database. The user, a computer program, or some other determining entity may determine which storage is the most appropriate to use for a given piece of data and stores the data in a manner to enable automatic flow of the data through the rest of the system in a seamless and integrated fashion. The system may also facilitate manual and automated workflows (e.g., Modeling, Geological, and Geophysical workflows) based upon the persisted data.

In one or more embodiments, the data rendering unit (236) performs rendering algorithm calculations to provide one or more displays for visualizing the data. The displays for visualizing the data may be presented, using one or more communication links, to a user at the display unit (216) of the surface unit (202). The data rendering unit (236) may contain a 2D canvas, a 3D canvas, a well section canvas, or other canvases, either by default or as selected by a user. The data rendering unit (236) may selectively provide displays composed of any combination of one or more canvases. The canvases may or may not be synchronized with each other during display. In one or more embodiments, the data rendering unit (236) is provided with mechanisms for actuating various canvases or other functions in the system. Further, the data rendering unit (236) may selectively provide displays composed of any combination of one or more volume data sets. The volume data sets typically contain exploration and production data.

While specific components are depicted and/or described for use in the units and/or modules of the fracture orientation tool (208), it will be appreciated that a variety of components with various functions may be configured to provide the formatting, processing, utility, and coordination functions necessary to process data in the fracture orientation tool (208). The components may have combined functionalities and may be implemented as software, hardware, firmware, or suitable combinations thereof.

Further, components (e.g., the processing modules (242), the data rendering unit (236), etc.) of the fracture orientation tool (208) may be located in an onsite server (222) or in distributed locations where a remote server (224) and/or a third party server (226) may be involved. The onsite server (222) may be located within the surface unit (202).

Figure 3:
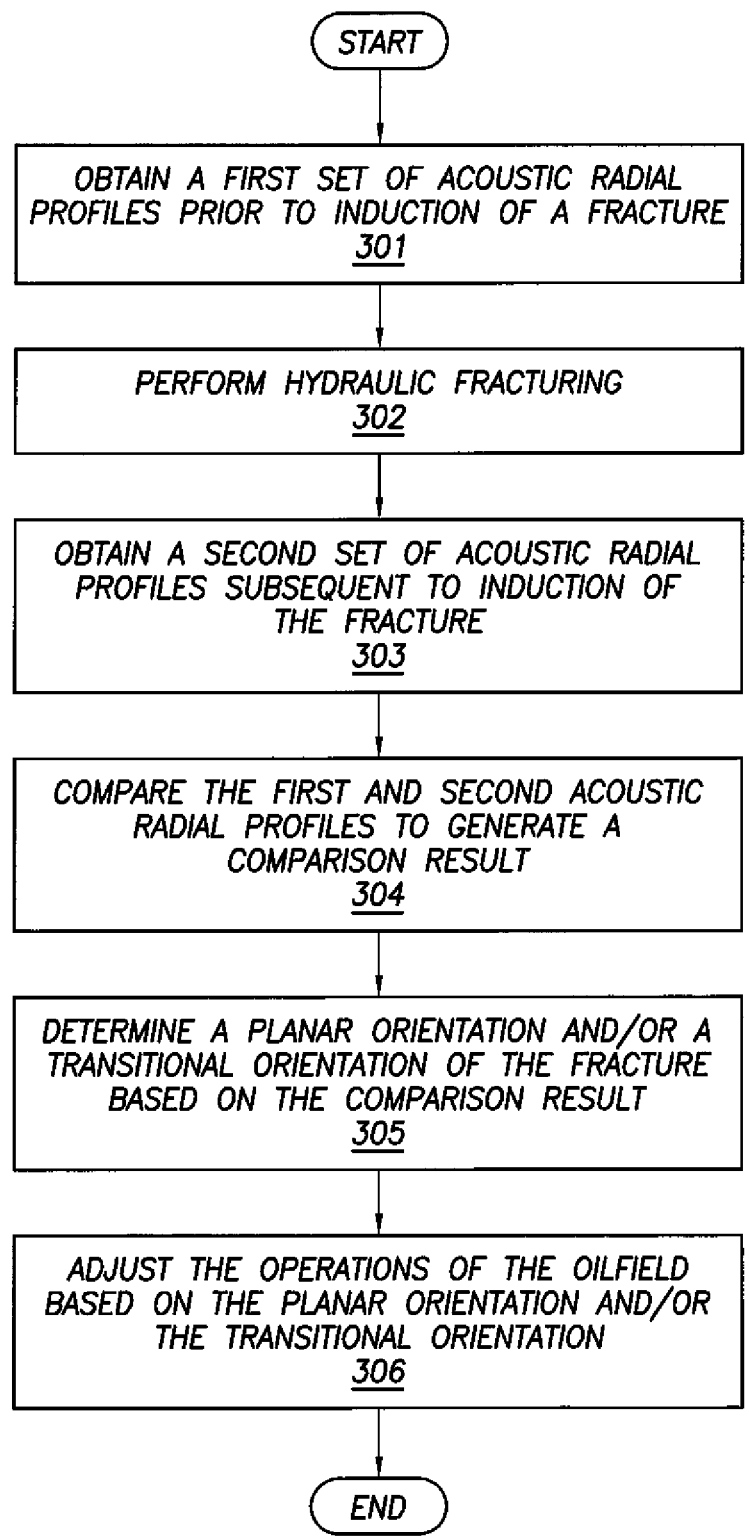
FIG. 3 depicts an example method for determining fracture orientation using wellbore acoustic radial profiles in accordance with one or more embodiments.

FIG. 3 depicts an example method for determining fracture orientation using wellbore acoustic radial profiles in accordance with one or more embodiments. For example, the method depicted in FIG. 3 may be practiced using the fracture orientation tool (208) described in reference to FIG. 2 above for determining fracture orientation (120-1, 120-3) and/or transitional orientation (120-2) described in reference to FIG. 1.2 above. In one or more embodiments, one or more of the elements shown in FIG. 3 may be omitted, repeated, and/or performed in a different order. Accordingly, embodiments of determining fracture orientation using acoustic radial profiles should not be considered limited to the specific arrangements of elements shown in FIG. 3.

In one or more embodiments, the elements shown in FIG. 3 are performed in a section of the wellbore where no pre-existing fractures exist. For example, this condition may be confirmed with a pre-fracture wellbore imaging pass using LWD and/or wireline tools described with respect to FIG. 2 above.

Initially in element (301), a set of acoustic radial profiles of the subterranean formation is obtained based on sonic logging of the wellbore prior to induction of a fracture. In one or more embodiments, element (301) may be performed in conjunction with evaluation of an initial mechanical earth model (MEM) and oilfield operations planning.

In element (302), a hydraulic fracturing operation of the wellbore is performed to induce the fracture. For example, a vertical wellbore (section) may be hydraulically pressured to induce a fracture aligned with the wellbore axis aligned plane with a front that propagates in the direction of the maximum horizontal stress as it exits the wellbore. In one or more embodiments, this propagation direction may be confirmed with a post-induction wellbore imaging pass, for example using the LWD and/or wireline tools described with respect to FIG. 2 above. In some formations where the two orthogonally oriented horizontal stresses are equal or almost equal in magnitude, stress does not control the fracture propagation direction and the induced fracture (more specifically, the fracture front) may propagate in an azimuthal direction determined by the texture of the formation rock. In one or more embodiments, this propagation direction may be analyzed using pre- and post-induction radial profiles. For example, a vertical fracture may be initiated following one azimuthal direction (e.g., 30 degrees from the azimuth of the maximum horizontal stress) due to the texture of the rock, then rotate back to the azimuth of the maximum horizontal stress at some radial distance away from the wellbore.

In element (303), a second set of acoustic radial profiles of the subterranean formation is obtained based on a second sonic logging pass of the wellbore subsequent to the induction of the fracture. In one or more embodiments, the second sonic logging may be performed in real time at one or more stages in time during the fracturing operation or performed subsequent to the completion of the fracturing operation. Accordingly, the second acoustic radial profile may reflect the acoustic properties of the formation rock in real time during the fracturing operation or subsequent to the completion of the fracturing operation.

In element (304), the first (i.e., pre-induction) and second (i.e., post-induction) acoustic radial profiles are compared based on a pre-determined criterion to generate a comparison result as a function of the radial distance. In one or more embodiments, acoustic measurements sensitive to the fracture geometry are extracted from the first and second acoustic radial profiles for generating comparison results that are relevant to determining properties of the geometry. As noted above typically in a vertical well, the fracture may initially propagate along the fast shear azimuth or along directions dictated by rock texture in certain horizontal stress configurations. Both cases may be diagnosed using imaging techniques employed by the LWD tools, and/or wireline tools described with respect to FIG. 2 above.

In element (305), an orientation or range of orientations within a portion of the fracture is determined based on time-lapse comparison of radial profiles. In one or more embodiments, portions of the fracture having distinct orientation characteristics (e.g., vertical orientation, horizontal orientation, transitional orientation, etc.) may be identified based on changes in the acoustic response at a particular radial distance. In one or more embodiments, the difference in acoustic response may be compared to a pre-determined noise or aberration threshold to determine if this difference represents a genuine feature of the fracture, or may be scrutinized for local maximum or inflection points. In one or more embodiments, orientation characteristics of the fracture may be determined/identified based on the aforementioned analysis results. In one or more embodiments, the orientation characteristics of the fracture may be determined in real time during the hydraulic fracturing operation at multiple stages in time. In one or more embodiments, the orientation characteristics of the fracture may be determined subsequent to the completion of hydraulic fracturing operation.

More details of such numerical techniques employed in the aforementioned analysis are described using example acoustic radial profiles depicted in FIGS. 4 and 5 below.

In element (306), the operations of the oilfield are adjusted based on the orientation characteristics, such as vertical orientation, horizontal orientation, transitional orientation, etc. For example, such orientation characteristics may be considered in determining fracturing parameters (e.g., location in the wellbore, appropriate intervals for fracturing, etc.), predicting potential twisting of fractures during production, forecasting fracture induced production improvements, etc.

Optionally, a MEM of the subterranean formation may be adjusted based on the orientation characteristics such that the operations of the oilfield may be performed based on the adjusted MEM.

FIGS. 4.1 and 4.2 depict example radial profiles for determining fracture orientation using wellbore acoustic radial profiles in accordance with one or more embodiments. As shown in FIGS. 4.1 and 4.2, vertical axes of the graphs (400-1, 400-2, 410-1, 410-2) represent shear moduli while horizontal axes of the graphs (400-1, 400-2, 410-1, 410-2) represent radial distance from the center of the wellbore. As an example, the graphs (400-1, 400-2, 410-1, 410-2) represent simulated acoustic radial profiles associated with the wellbore section (111) and the fracture (120-1 to 120-3) depicted in FIG. 1.2 above.

FIG. 4.1 illustrates simulated effects of a fracture on shear moduli $C_{44}$ and $C_{55}$ for a vertical wellbore. As shown, acoustic radial profiles, designated according to the legend (408), are computed before and after the introduction of two different fractures using a non-linear elastic model.

Graph (400-1) shows that the presence of a vertical fracture, within the radial distance range (403), aligned with the fast shear azimuth has a minimal effect on the $C_{44}$ curve (402-1) but reduces the $C_{55}$ curve (401-1) from the solid pre-induction line to the dashed post-induction line. The difference (i.e., comparison result) between the solid and dashed lines as a function of radial distance may be represented by the monotonically decreasing curve (500-1) depicted in FIG. 5.

Graph (400-2) shows the effects on $C_{44}$ and $C_{55}$ of a fracture having a vertically oriented portion within the radial distance range (405), and a horizontally oriented portion within the radial distance range (406). As shown, reductions from the solid pre-induction line to the dashed post-induction line for both the $C_{44}$ curve (402-2) and the $C_{55}$ curve (401-2) occur over the radial distance range (406) of the horizontal portion of the fracture. Moreover, the shapes of both radial profile curves (401-2) and (402-2) are distinctly affected by the transition from the vertical portion of the fracture to the horizontal portion of fracture. Generally speaking, a third portion (omitted in graph (400-2) for clarity) of the fracture with rotating orientation may be identified as the fracture transitions from the vertical portion within the radial distance range (405) to the horizontal portion within the radial distance range (406).

The difference between the pre- and post-induction curves of both $C_{44}$ (402-2) and $C_{55}$ curve (401-2) as functions of radial distance may be further represented by the curve (500-2) depicted in FIG. 5. As shown in graph (500-2), a local maximum (501) of the curve (500-2) occurs at a location (corresponding to (404) of curve (402-2) and (407) of curve (401-2) in FIG. 4.1) within the radial distance range (406) corresponding to the horizontal portion of the fracture. Accordingly, the horizontal portion of the fracture may be identified (i.e., a horizontal orientation of the portion of the fracture determined) by analyzing differences in the pre-induction and post-induction acoustic radial profiles to detect local maximum (501) using numerical analysis techniques. Alternatively, the horizontal portion of the fracture may be identified by comparing the curve depicted in graph (500-2) to a threshold (502). In one or more embodiments, the threshold (502) may be pre-determined empirically to eliminate effects of inherent variations in the rock properties and/or measurements tolerances associated with the MWD tools, LWD tools, and/or wireline tools.

FIG. 4.2 illustrates simulated effects of a fracture on shear modulus $C_{66}$ for a vertical wellbore. Graph (410-1) shows that the induction of a purely vertical fracture within the radial distance range (412) depresses the $C_{66}$ curve (409-1) from the solid pre-induction line to the dashed post-induction line. However if a portion of the fracture is horizontally oriented within the radial distance range (415) with the remaining portion being vertically oriented within the radial distance range (414), the $C_{66}$ curve (409-2) is shown to be unaffected by the horizontal portion, i.e., the solid pre-induction line merges with the dashed post-induction line.

The difference (i.e., comparison result) between the pre-induction post-induction curves of $C_{66}$ (409-2) as a function of radial distance may be represented by the curve (500-3) depicted in FIG. 5. As shown in graph (500-3), an inflection point (503) of the curve (500-3) (depicted as intersecting a tangential dash line at the inflection point (503)) occurs at a location (corresponding to (413) of graph (410-2)) preceding the radial distance range (415). Accordingly, a transitional orientation from the vertical portion to the horizontal portion of the fracture may be identified by analyzing differences between the pre- and post-induction acoustic radial profiles to detect the inflection point (503) using numerical analysis techniques.

In summary, for a vertical wellbore section, by measuring $C_{44}$, $C_{55}$, and $C_{66}$ before and after the induction of a fracture, a portion of a fracture may be determined to be vertical (minimal effect on $C_{44}$ while $C_{55}$ and $C_{66}$ depressed), horizontal (minimal effect on $C_{66}$ while $C_{44}$ and $C_{55}$ depressed), or in transition between horizontal and vertical ($C_{44}$, $C_{55}$, and $C_{66}$ all affected).

Occasionally, inhomogeneities in formation rock may produce irregularities in the shape of an acoustic radial profile which could be mis-interpreted to represent a feature of a fracture if only one set of acoustic radial profiles is available. In one or more embodiments, a single set of measurements made when the fracture is already present may be used to corroborate other independent evidence (e.g., from resistivity measurements, image logs, etc.) of a transition in fracture orientation, or to confirm the presence of a fracture (e.g., based on a local depression in the shape of the acoustic radial profile).

The underlying model used to simulate the variation of $C_{66}$ with respect to radial distance into the formation, as shown in FIG. 4.2, may not consider the mobility effect on the Stoneley wave related properties. Thus, it should be noted that the inversion of $C_{66}$ from the actual measurements may be relatively lower (i.e., the formation may appear to be more compliant) due to the mobility of borehole fluids percolating into the fracture. Such mobility effects may be minimized by using a high viscosity mud in the borehole, or sealing the fracture with mudcake. Alternatively, mobility effects may be distinguished from compliance related changes, or removed altogether during data processing by employing a theoretical model of Stoneley wave propagation in the presence of a fracture.

Further, although the vertical wellbore is used in examples above to describe embodiments of determining fracture orientation using wellbore acoustic radial profiles, it is contemplated that variations of these embodiments may be applied to horizontal or deviated wells.

Figure 6:
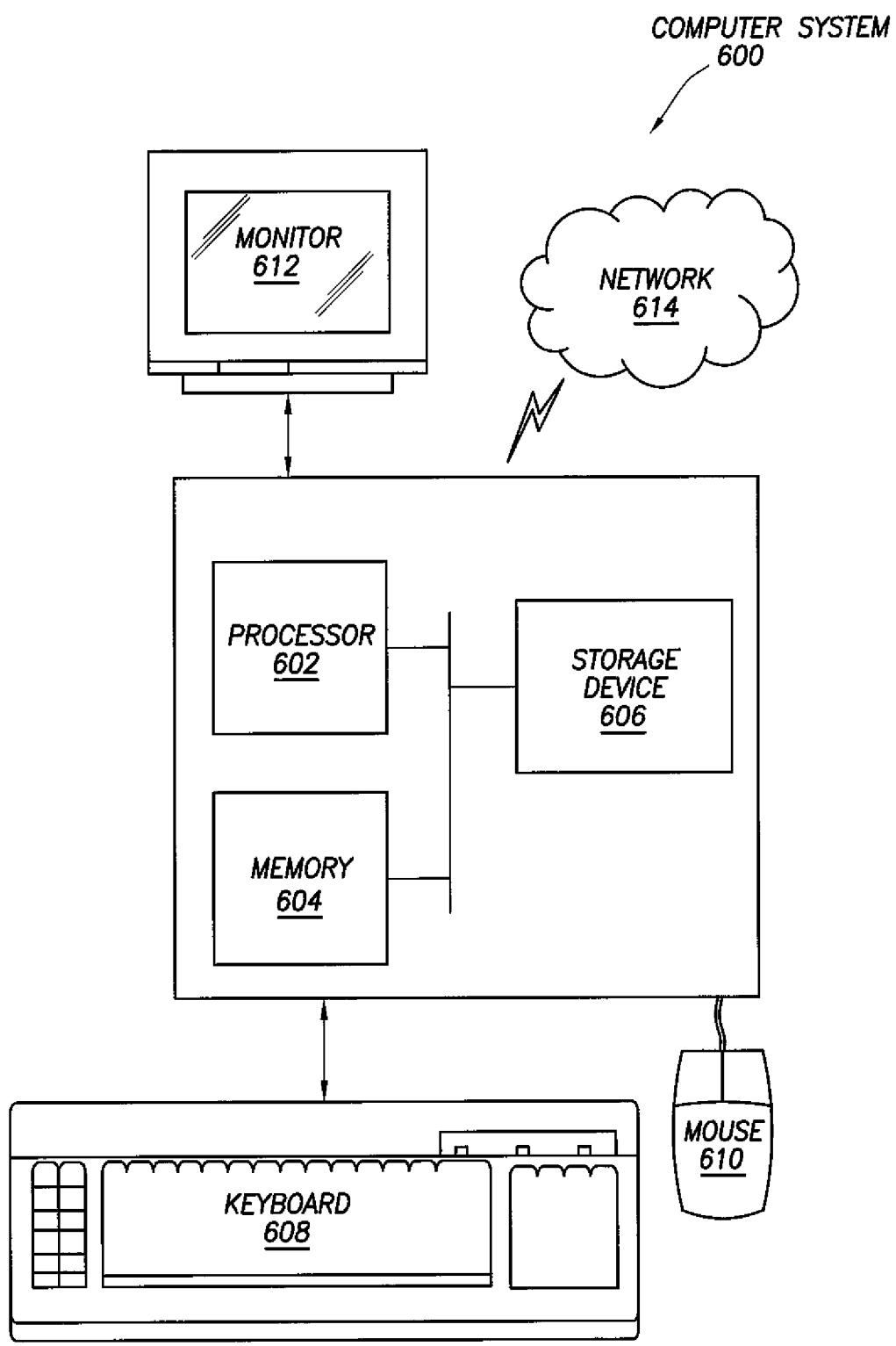
FIG. 6 depicts a computer system in which one or more embodiments of determining fracture orientation using wellbore acoustic radial profiles may be implemented.

Embodiments of determining fracture orientation using wellbore acoustic radial profiles may be implemented on virtually any type of computer regardless of the platform being used. For instance, as shown in FIG. 6, a computer system (600) includes one or more processor(s) (602) such as a central processing unit (CPU) or other hardware processor, associated memory (604) (e.g., random access memory (RAM), cache memory, flash memory, etc.), a storage device (606) (e.g., a hard disk, an optical drive such as a compact disk drive or digital video disk (DVD) drive, a flash memory stick, etc.), and numerous other elements and functionalities typical of today's computers (not shown). The computer (600) may also include input means, such as a keyboard (608), a mouse (610), or a microphone (not shown). Further, the computer (600) may include output means, such as a monitor (612) (e.g., a liquid crystal display LCD, a plasma display, or cathode ray tube (CRT) monitor). The computer system (600) may be connected to a network (614) (e.g., a local area network (LAN), a wide area network (WAN) such as the Internet, or any other similar type of network) via a network interface connection (not shown). Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means may take other forms, now known or later developed. Generally speaking, the computer system (600) includes at least the minimal processing, input, and/or output means necessary to practice one or more embodiments.

Further, those skilled in the art will appreciate that one or more elements of the aforementioned computer system (600) may be located at a remote location and connected to the other elements over a network. Further, one or more embodiments may be implemented on a distributed system having a plurality of nodes, where each portion of the implementation (e.g., the direction tool, the servers) may be located on a different node within the distributed system. In one or more embodiments, the node corresponds to a computer system. Alternatively, the node may correspond to a processor with associated physical memory. The node may alternatively correspond to a processor with shared memory and/or resources. Further, software instructions to perform one or more embodiments may be stored on a computer readable medium such as a compact disc (CD), a diskette, a tape, or any other computer readable storage device.

The systems and methods provided relate to the acquisition of hydrocarbons from an oilfield. It will be appreciated that the same systems and methods may be used for performing subsurface operations, such as mining, water retrieval and acquisition of other underground fluids or other geomaterials materials from other fields. Further, portions of the systems and methods may be implemented as software, hardware, firmware, or combinations thereof.

While determining fracture orientation using wellbore acoustic radial profiles has been described with respect to a limited number of embodiments, those skilled in the art, having benefit of this disclosure, will appreciate that other embodiments may be devised which do not depart from the scope of determining fracture orientation using wellbore acoustic radial profiles as disclosed herein. Accordingly, the scope of determining fracture orientation using wellbore acoustic radial profiles should be limited only by the attached claims.

What is claimed is:

1. A method for performing field operations having at least one wellsite, each wellsite having a wellbore penetrating a subterranean formation for accessing or storing substances therein, the method comprising:

obtaining a first set of acoustic radial profiles of the subterranean formation based on a first sonic logging pass of the wellbore prior to induction of a fracture disposed about the wellbore, wherein the first set of acoustic radial profiles comprises a first set of elastic wave moduli as first functions of radial distance from the wellbore;

obtaining a second set of acoustic radial profiles of the subterranean formation based on a second sonic logging pass of the wellbore subsequent to the induction of the fracture, wherein the second set of acoustic radial profiles comprises a second set of elastic wave moduli as second functions of the radial distance;

comparing, using a central processing unit (CPU) of a computer system, the first set of acoustic radial profiles and the second set of acoustic radial profiles based on a pre-determined criterion to generate a comparison result comprising a difference;

calculating at least one data item selected from a group consisting of a local maximum of the difference and a point of inflection of the difference from the comparison result;

determining, using the CPU and based on the at least one data item, an orientation of one or more portions of the fracture; and adjusting the operations of the oilfield based on the orientation.

2. The method of claim 1, further comprising:
performing a hydraulic fracturing operation of the wellbore to induce the fracture,
wherein the orientation is determined in real time during the hydraulic fracturing operation at multiple times.

3. The method of claim 1, further comprising:
adjusting, using the CPU, a mechanical earth model (MEM) of the subterranean formation based on the orientation,
wherein adjusting the operations based on the orientation comprises simulating, using the CPU, the operations of the oilfield based on the MEM.

4. The method of claim 3, further comprising:
identifying, using the CPU, a transitional orientation of the fracture based on the comparison result; and
adjusting, using the CPU, the MEM further based on the transitional orientation of the fracture.

5. The method of claim 1,
wherein each of the first set of elastic wave moduli and second set of elastic wave moduli comprises a shear modulus $C_{44}$, associated with a plane containing an axis of the wellbore and a direction of a fast shear azimuth, and
wherein determining the orientation based on the comparison result comprises:
in response to identifying in the comparison result a value exceeding a pre-determined threshold at the portion of the fracture, identifying a transitional orientation of the fracture from a first orientation parallel to the axis of the wellbore to a second orientation perpendicular to a direction of the least far-field principal stress; and
determining the orientation based on an initial orientation of the fracture at the wellbore and the transitional orientation.

6. The method of claim 1,
wherein each of the first set of elastic wave moduli and second set of elastic wave moduli comprises shear modulus $C_{44}$, associated with a plane containing an axis of the wellbore and a direction of a fast shear azimuth, and
wherein determining the orientation based on the comparison result comprises:
in response to identifying in the comparison result a local maximum at the portion of the fracture, determining the orientation as being perpendicular to a direction of a least far-field principal stress.

7. The method of claim 1,
wherein each of the first set of elastic wave moduli and the second set of elastic wave moduli comprises shear modulus $C_{55}$, associated with a plane containing an axis of the wellbore and a direction of a slow shear azimuth, and
wherein determining the orientation based on the comparison result comprises:
in response to identifying in the comparison result a value exceeding a pre-determined threshold at the portion of the fracture, identifying a transitional orientation of the fracture from a first orientation parallel to the axis of the wellbore to a second orientation perpendicular to a direction of least far-field principal stress,
determining the orientation based on an initial orientation of the fracture at the wellbore and the transitional orientation.

8. The method of claim 1,
wherein each of the first set of elastic wave moduli and second set of elastic wave moduli comprises shear modulus $C_{55}$, associated with a plane containing an axis of the wellbore and a direction of a slow shear azimuth, and
wherein determining the orientation based on the comparison result comprises:
in response to identifying in the comparison result a local maximum at the portion of the fracture, determining the orientation as being perpendicular to a direction of least far-field principal stress.

9. The method of claim 1,
wherein each of the first set of elastic wave moduli and second set of elastic wave moduli comprises shear modulus $C_{66}$, associated with a plane perpendicular to an axis of the wellbore,
wherein determining the orientation based on the comparison result comprises:
in response to identifying in the comparison result a point of inflection, identifying a transitional orientation of the fracture from a first orientation parallel to the axis of the wellbore to a second orientation perpendicular to a direction of least far-field principal stress,
determining the orientation based on an initial orientation of the fracture at the wellbore and the transitional orientation.

10. The method of claim 9,
wherein the fracture is disposed about a vertical portion of the wellbore, and
wherein the first orientation is vertical and the second orientation is horizontal.

11. A system for performing operations of an oilfield having at least one wellsite, each wellsite having a wellbore penetrating a subterranean formation for accessing fluid of an underground reservoir therein, the system comprising:
a sonic logging tool disposed inside the wellbore and configured to:
obtain a first set of acoustic radial profiles of the subterranean formation prior to induction of a fracture disposed about the wellbore, wherein the first set of acoustic radial profiles comprises a first set of elastic wave moduli as first functions of radial distance from the wellbore; and obtain a second set of acoustic radial profiles of the subterranean formation subsequent to induction of the fracture, wherein the second set of acoustic radial profiles comprises a second set of elastic wave moduli as second functions of the radial distance;

a fracture orientation tool configured to:

compare the first set of acoustic radial profiles and the second set of acoustic radial profiles based on a pre-determined criterion to generate a comparison result comprising a difference;

calculate at least one data item selected from a group consisting of a local maximum of the difference and a point of inflection of the difference from the comparison result; and determine a transitional orientation of the fracture based on the at least one data item; and a controller configured to adjust the operations of the oilfield based on the transitional orientation.

12. The system of claim 11, wherein the fracture orientation tool is further configured to:

adjust a mechanical earth model (MEM) of the subterranean formation based on the transitional orientation, wherein adjusting the operations based on the orientation comprises simulating the operations of the oilfield based on the MEM.

13. The system of claim 12, wherein the fracture orientation tool is further configured to:

determine an orientation of a portion of the fracture based on the comparison result, and adjust the MEM further based on the orientation of the portion of the fracture.

14. The system of claim 13, wherein the first set of elastic wave moduli and second set of elastic wave moduli comprises shear modulus $C_{44}$, associated with a plane containing an axis of the wellbore and a direction of a fast shear azimuth, in the first and second functions of the radial distance, and wherein determining the orientation based on the comparison result comprises:

in response to identifying in the comparison result a local maximum at the portion of the fracture, determining the orientation as being perpendicular to a direction of least far-field principal stress.

15. The system of claim 13, wherein the first set of elastic wave moduli and second set of elastic wave moduli comprises shear modulus $C_{55}$, associated with a plane containing an axis of the wellbore and a direction of a slow shear azimuth, in the first and second functions of the radial distance, and wherein determining the orientation based on the comparison result comprises:

in response to identifying in the comparison result a local maximum at the portion of the fracture, determining the orientation as being perpendicular to a direction of least far-field principal stress.

16. The system of claim 11, wherein the first set of elastic wave moduli and second set of elastic wave moduli comprises shear modulus $C_{44}$, associated with a plane containing an axis of the wellbore and a direction of a fast shear azimuth, in the first and second functions of the radial distance, and wherein identifying the transitional orientation based on the comparison result comprises:

in response to identifying in the comparison result a value exceeding a pre-determined threshold at the portion of the fracture, identifying the transitional orientation from a first orientation parallel to the axis of the wellbore to a second orientation perpendicular to a direction of least far-field principal stress.

17. The system of claim 11, wherein the first set of elastic wave moduli and second set of elastic wave moduli comprises shear modulus $C_{55}$, associated with a plane containing an axis of the wellbore and a direction of a slow shear azimuth, in the first and second functions of the radial distance, and wherein identifying the transitional orientation based on the comparison result comprises:

in response to identifying in the comparison result a value exceeding a pre-determined threshold at the portion of the fracture, identifying the transitional orientation from a first orientation parallel to the axis of the wellbore to a second orientation perpendicular to a direction of least far-field principal stress.

18. The system of claim 11, wherein the first set of elastic wave moduli and second set of elastic wave moduli correspond to shear modulus $C_{66}$, associated with a plane perpendicular to the axis of the wellbore, in the first and second functions of the radial distance, wherein identifying the transitional orientation based on the comparison result comprises:

in response to identifying in the comparison result a point of inflection, identifying the transitional orientation from a first orientation parallel to the axis of the wellbore to a second orientation perpendicular to a direction of least far-field principal stress.

19. The system of claim 18, wherein the fracture is disposed about a vertical portion of the wellbore, and wherein the first orientation is vertical and the second orientation is horizontal.

20. A computer readable medium storing instructions for performing operations of an oilfield having at least one wellsite, each wellsite having a wellbore penetrating a subterranean formation for accessing fluid of an underground reservoir therein, the instructions when executed causing a processor to:

obtain a first set of acoustic radial profiles of the subterranean formation based on first sonic logging of the wellbore prior to induction of a fracture disposed about the wellbore, wherein the first set of acoustic radial profiles comprises a first set of elastic wave moduli as first functions of radial distance from the wellbore;

obtain a set of second acoustic radial profiles of the subterranean formation based on a second sonic logging pass of the wellbore subsequent to the induction of the fracture, wherein the second set of acoustic radial profiles comprises a second set of elastic wave moduli as second functions of the radial distance;

compare the first set of radial profiles and second set of acoustic radial profiles based on a pre-determined criterion to generate a comparison result comprising a difference;

calculate at least one data item selected from a group consisting of a local maximum of the difference and a point of inflection of the difference from the comparison result;

determine, based on the at least one data item, a transitional orientation of the fracture;

determine an orientation of a portion of the fracture based on an initial orientation of the fracture at the wellbore and the transitional orientation and adjust the operations of the oilfield based on the orientation.

\* \* \* \* \*